US011816042B2

(12) United States Patent
Iyer et al.

(10) Patent No.: US 11,816,042 B2
(45) Date of Patent: Nov. 14, 2023

(54) PLATFORM FRAMEWORK TELEMETRY

(71) Applicant: Dell Products, L.P., Round Rock, TX (US)

(72) Inventors: Vivek Viswanathan Iyer, Austin, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 17/355,223

(22) Filed: Jun. 23, 2021

(65) Prior Publication Data
US 2022/0414026 A1    Dec. 29, 2022

(51) Int. Cl.
*G06F 13/16*      (2006.01)
*G06F 9/38*      (2018.01)
*G06F 9/54*      (2006.01)

(52) U.S. Cl.
CPC ........ *G06F 13/1605* (2013.01); *G06F 9/3838* (2013.01); *G06F 9/541* (2013.01); *G06F 2213/0038* (2013.01)

(58) Field of Classification Search
CPC ..... G06F 3/00; G06F 5/00; G06F 9/00; G06F 12/00; G06F 13/00
See application file for complete search history.

(56) References Cited

U.S. PATENT DOCUMENTS

2021/0075730 A1*   3/2021   Palermo .............. H04L 47/6275

* cited by examiner

*Primary Examiner* — Scott C Sun
(74) *Attorney, Agent, or Firm* — Fogarty LLP

(57) ABSTRACT

Embodiments of systems and methods for platform framework telemetry are described. In some embodiments, an Information Handling System (IHS) may include a processor and a memory coupled to the processor, the memory having program instructions stored thereon that, upon execution, cause the IHS to: receive telemetry data at a telemetry service from at least one producer registered with a platform framework via an Application Programming Interface (API); receive a request for at least a subset of the telemetry data from a consumer registered with the platform framework via the API; and transmit the subset of the telemetry data to the consumer.

19 Claims, 8 Drawing Sheets

PLATFORM FRAMEWORK TELEMETRY

FIELD

The present disclosure relates generally to Information Handling Systems (IHSs), and more particularly, to systems and methods for platform framework telemetry.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Embodiments of systems and methods for platform framework telemetry are described. In an illustrative, non-limiting embodiment, an Information Handling System (IHS) may include a processor and a memory coupled to the processor, the memory having program instructions stored thereon that, upon execution, cause the IHS to: receive telemetry data at a telemetry service from at least one producer registered with a platform framework via an Application Programming Interface (API); receive a request for at least a subset of the telemetry data from a consumer registered with the platform framework via the API; and transmit the subset of the telemetry data to the consumer.

The telemetry data may include get and set request operations. Moreover, the request for the subset of the telemetry data may be received from the consumer prior to the telemetry data being received from the at least one producer.

The program instructions, upon execution, may cause the IHS to: receive another request for at least the subset of the telemetry data from another consumer after having received the request; and transmit the subset of the telemetry data to the other consumer prior to transmission of the subset of the telemetry data to the consumer.

To transmit the subset of the telemetry data to the other consumer, the program instructions, upon execution, may cause the IHS to resolve an arbitration policy in favor of the other consumer. To resolve the arbitration policy, the program instructions, upon execution, may cause the IHS to determine that a priority of the other request is higher than a priority to the request. The determination may be based at least in part upon context information comprising at least one of: a temperature metric, a power state, a battery metric, an IHS posture, user proximity or presence data, or an IHS location.

Additionally, or alternatively, the determination may be based at least in part upon bi-directed graph data representing get and set operations. The bi-directed graph data may be indexed by a System-on-Chip (SoC) register address. Each of the get and set operations may be associated with a priority value. The priority value may be indicative of a dependency between get and set operations.

The telemetry service may be configured to: receive the telemetry data from a plurality of producers concurrently during a first alternating time interval; and transmit the subset of the telemetry data to the consumer during a second alternating time interval following the first time interval, where a length of the second time interval is configurable based upon a characteristic of the telemetry data. The characteristic may include a telemetry data polling or sampling rate. The length of the second time interval may be further configurable based upon context information comprising at least one of: a temperature metric, a power state, a battery metric, an IHS posture, user proximity or presence data, or an IHS location.

In another illustrative, non-limiting embodiment, a memory storage device may have program instructions stored thereon that, upon execution by an IHS, cause the IHS to: collect telemetry data, by a producer registered with a platform framework via an API; and transmit the telemetry data to a telemetry service within the platform framework via the API, where the telemetry service is configured to: receive a request for at least a subset of the telemetry data from a consumer registered with the platform framework via the API; and transmit the subset of the telemetry data to the consumer.

The telemetry service may be further configured to: receive another request for at least the subset of the telemetry data from another consumer after having received the request; resolve an arbitration policy in favor of the other consumer; and transmit the subset of the telemetry data to the other consumer prior to transmission of the subset of the telemetry data to the consumer. To resolve an arbitration policy in favor of the other consumer, the telemetry service may be further configured to determine that a priority of the other request is higher than a priority to the request based upon bi-directed graph data representing get and set operations.

In yet another illustrative, non-limiting embodiment, a method may include: transmitting a request for telemetry data by a consumer registered with a platform framework via an API to a telemetry service within the platform framework; and receiving the telemetry data from the telemetry service, where the telemetry service is configured to receive the telemetry from at least one producer registered with the platform framework via the API.

The telemetry service may be further configured to: receive another request for at least the subset of the telemetry data from another consumer after having received the request; resolve an arbitration policy in favor of the other consumer; and transmit the subset of the telemetry data to the other consumer prior to transmitting the subset of the telemetry data to the consumer. To resolve an arbitration policy in favor of the other consumer, the telemetry service may be further configured to determine that a priority of the other request is higher than a priority to the request based upon bi-directed graph data representing get and set operations.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIGS. 4A, 4B-1, and 4B-2 are block diagrams illustrating examples of a method for telemetry data collection and processing, according to some embodiments.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
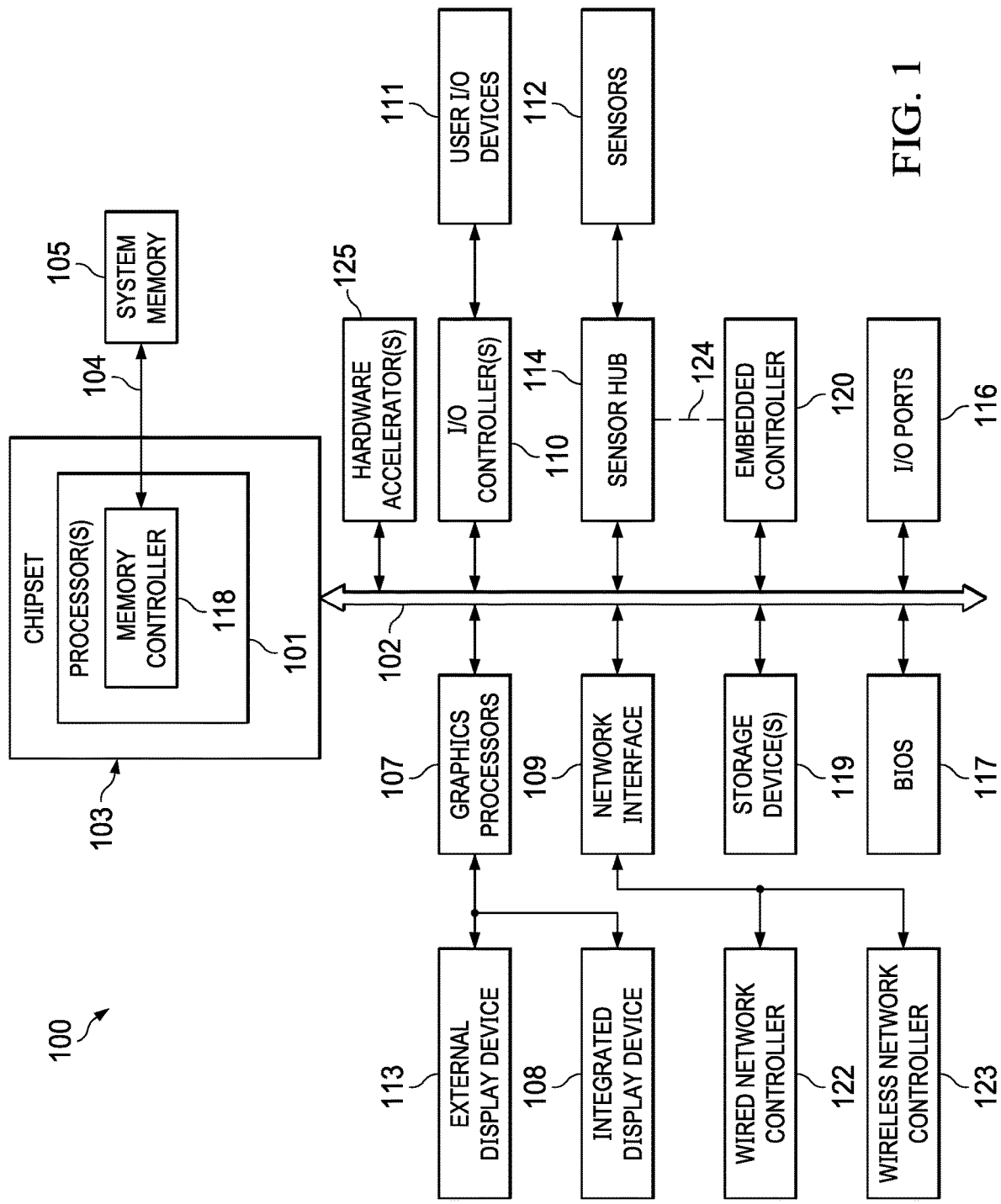
FIG. 1 is a block diagram of an example of hardware components of an Information Handling System (IHS), according to some embodiments.

FIG. 1 is a block diagram illustrating components of IHS 100 configured according to some embodiments. As shown, IHS 100 includes one or more processor(s) 101, such as a Central Processing Unit (CPU), that execute code retrieved from system memory 105.

Although IHS 100 is illustrated with a single processor, other embodiments may include two or more processors, that may each be configured identically, or to provide specialized processing operations. Processor(s) 101 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 101 includes integrated memory controller 118 that may be implemented directly within its circuitry. Alternatively, memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 is coupled to processor(s) 101 and provides processor(s) 101 with a high-speed memory that may be used in the execution of computer program instructions. For example, system memory 105 may include memory components, such as static RAM (SRAM), dynamic RAM (DRAM), NAND Flash memory, suitable for supporting high-speed memory operations by the processor 101. In certain embodiments, system memory 105 may combine both persistent, non-volatile, and volatile memor(ies). In certain embodiments, system memory 105 may include multiple removable memory modules.

IHS 100 utilizes chipset 103 that may include one or more integrated circuits coupled to processor(s) 101. In this embodiment, processor(s) 101 is depicted as a component of chipset 103. In other embodiments, all of chipset 103, or portions of chipset 103 may be implemented directly within the integrated circuitry of processor(s) 101. Chipset 103 provides processor(s) 101 with access to a variety of resources accessible via bus 102.

In IHS 100, bus 102 is illustrated as a single element. However, other embodiments may utilize any number of separate buses to provide the illustrated pathways served by bus 102.

In various embodiments, IHS 100 may include one or more I/O ports 116 that may support removeable couplings with various types of external devices and systems, including removeable couplings with peripheral devices that may be configured for operation by a particular user of IHS 100. For instance, I/O 116 ports may include USB (Universal Serial Bus) ports, by which a variety of external devices may be coupled to IHS 100. In addition to, or instead of USB ports, I/O ports 116 may include various types of physical I/O ports that are accessible to a user via an enclosure or chassis of IHS 100.

In certain embodiments, chipset 103 may additionally utilize one or more I/O controllers 110 that may each support the operation of hardware components such as user I/O devices 111. User I/O devices 111 may include peripheral components that are physically coupled to I/O port 116 and/or peripheral components wirelessly coupled to IHS 100 via network interface 109.

In various implementations, I/O controller 110 may support the operation of one or more user I/O devices 110 such as a keyboard, mouse, touchpad, touchscreen, microphone, speakers, camera and other input and output devices that may be coupled to IHS 100. User I/O devices 111 may interface with an I/O controller 110 through wired or wireless couplings supported by IHS 100. In some cases, I/O controllers 110 may support configurable operation of supported peripheral devices, such as user I/O devices 111.

As illustrated, a variety of additional resources may be coupled to processor(s) 101 of IHS 100 through chipset 103. For instance, chipset 103 may be coupled to network interface 109 to enable different types of network connectivity. IHS 100 may also include one or more Network Interface Controllers (NICs) 122 and 123, each of which may implement the hardware required for communicating via a specific networking technology, such as Wi-Fi, BLUETOOTH, Ethernet and mobile cellular networks (e.g., CDMA, TDMA, LTE).

Network interface 109 may support network connections by wired network controller(s) 122 and wireless network controller(s) 123. Each network controller 122 and 123 may be coupled via various buses to chipset 103 to support different types of network connectivity, such as the network connectivity utilized by IHS 100.

Chipset 103 may also provide access to one or more display device(s) 108 and/or 113 via graphics processor(s) 107. Graphics processor(s) 107 may be included within a video card, graphics card, and/or an embedded controller installed within IHS 100. Additionally, or alternatively, graphics processor(s) 107 may be integrated within processor(s) 101, such as a component of a system-on-chip (SoC). Graphics processor(s) 107 may generate display information and provide the generated information to display device(s) 108 and/or 113.

One or more display devices 108 and/or 113 are coupled to IHS 100 and may utilize LCD, LED, OLED, or other display technologies (e.g., flexible displays, etc.). Each display device 108 and 113 may be capable of receiving touch inputs such as via a touch controller that may be an embedded component of the display device 108 and/or 113 or graphics processor(s) 107, for example, or may be a separate component of IHS 100 accessed via bus 102. In some cases, power to graphics processor(s) 107, integrated display device 108 and/or external display 133 may be turned off or configured to operate at minimal power levels in response to IHS 100 entering a low-power state (e.g., standby).

As illustrated, IHS 100 may support integrated display device 108, such as a display integrated into a laptop, tablet, 2-in-1 convertible device, or mobile device. IHS 100 may also support use of one or more external displays 113, such as external monitors that may be coupled to IHS 100 via various types of couplings, such as by connecting a cable from the external display 113 to external I/O port 116 of the IHS 100, via wireless docking station, etc. In certain scenarios, the operation of integrated displays 108 and external displays 113 may be configured for a particular user. For instance, a particular user may prefer specific brightness settings that may vary the display brightness based on time of day and ambient lighting conditions.

Chipset 103 also provides processor(s) 101 with access to one or more storage devices 119. In various embodiments, storage device 119 may be integral to IHS 100 or may be external to IHS 100. Moreover, storage device 119 may be accessed via a storage controller that may be an integrated component of the storage device.

Generally, storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud system or enterprise data management system that is accessible via network interface 109.

As illustrated, IHS 100 also includes Basic Input/Output System (BIOS) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. Under execution, BIOS 117 instructions may facilitate the loading of an operating system (OS) (e.g., WINDOWS, MACOS, iOS, ANDROID, LINUX, etc.) for use by IHS 100.

BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

As illustrated, certain IHS 100 embodiments may utilize sensor hub 114 (e.g., INTEL Sensor Hub or "ISH," etc.) capable of sampling and/or collecting data from a variety of hardware sensors 112. For instance, sensors 112, may be disposed within IHS 100, and/or display 110, and/or a hinge coupling a display portion to a keyboard portion of IHS 100, and may include, but are not limited to: electric, magnetic, hall effect, radio, optical, infrared, thermal, force, pressure, touch, acoustic, ultrasonic, proximity, position, location, angle (e.g., hinge angle), deformation, bending (e.g., of a flexible display), orientation, movement, velocity, rotation, acceleration, bag state (in or out of a bag), and/or lid sensor(s) (open or closed).

In some cases, one or more sensors 112 may be part of a keyboard or other input device. Processor(s) 101 may be configured to process information received from sensors 112 through sensor hub 114, and to perform methods for prioritizing the pre-loading of applications with a constrained memory budget using contextual information obtained from sensors 112.

For instance, during operation of IHS 100, the user may open, close, flip, swivel, or rotate display 108 to produce different IHS postures. In some cases, processor(s) 101 may be configured to determine a current posture of IHS 100 using sensors 112 (e.g., a lid sensor, a hinge sensor, etc.). For example, in a dual-display IHS implementation, when a first display 108 (in a first IHS portion) is folded against a second display 108 (in a second IHS portion) so that the two displays have their backs against each other, IHS 100 may be said to have assumed a book posture. Other postures may include a table posture, a display posture, a laptop posture, a stand posture, or a tent posture, depending upon whether IHS 100 is stationary, moving, horizontal, resting at a different angle, and/or its orientation (landscape vs. portrait).

For instance, in a laptop posture, a first display surface of a display 108 may be facing the user at an obtuse angle with respect to a second display surface of a display 108 or a physical keyboard portion. In a tablet posture, a first display surface may be at a straight angle with respect to a second display surface or a physical keyboard portion. And, in a book posture, a first display surface may have its back (e.g., chassis) resting against the back of a second display surface or a physical keyboard portion.

It should be noted that the aforementioned postures and their various respective keyboard states are described for sake of illustration only. In different embodiments, other postures may be used, for example, depending upon the type of hinge coupling the displays, the number of displays used, or other accessories.

In other cases, processor(s) 101 may process user presence data received by sensors 112 and may determine, for example, whether an IHS's end-user is present or absent. Moreover, in situations where the end-user is present before IHS 100, processor(s) 101 may further determine a distance of the end-user from IHS 100 continuously or at pre-determined time intervals. The detected or calculated distances may be used by processor(s) 101 to classify the user as being in the IHS's near-field (user's position<threshold distance A), mid-field (threshold distance A<user's position<threshold distance B, where B>A), or far-field (user's position>threshold distance C, where C>B) with respect to IHS 100 and/or display 108.

More generally, in various implementations, processor(s) 101 may receive and/or produce context information using sensors 112 via sensor hub 114, including one or more of, for example: a user's presence or proximity state (e.g., present, near-field, mid-field, far-field, and/or absent using a Time-of-Flight or "ToF" sensor, visual image sensor, infrared sensor, and/or other suitable sensor 112), a facial expression of the user (e.g., usable for mood or intent classification), a direction and focus of the user's gaze, a user's hand gesture, a user's voice, an IHS location (e.g., based on the location of a wireless access point or Global Positioning System, etc.), IHS movement (e.g., from an accelerometer or gyroscopic sensor), lid state (e.g., of a laptop or other hinged form factor), hinge angle (e.g., in degrees), IHS posture (e.g., laptop, tablet, book, tent, display, etc.), whether the IHS is coupled to a dock or docking station (e.g., wired or wireless), a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., by determine whether or not the user is holding a stylus, or the like), a time of day, software application(s) under execution in focus for receiving keyboard input, whether IHS 100 is inside or outside of a carrying bag or case, a level of ambient lighting, a battery charge level, whether IHS 100 is operating from battery power or is plugged into an AC power source (e.g., whether the IHS is operating in AC-only mode, DC-only mode, or AC+DC mode), a power mode or rate of power consumption of various components of IHS 100 (e.g., CPU 101, GPU 107, system memory 105, etc.).

In certain embodiments, sensor hub 114 may be an independent microcontroller or other logic unit that is coupled to the motherboard of IHS 100. Sensor hub 114 may be a component of an integrated system-on-chip incorporated into processor(s) 101, and it may communicate with chipset 103 via a bus connection such as an Inter-Integrated Circuit ($I^2C$) bus or other suitable type of bus connection. Sensor hub 114 may also utilize an $I^2C$ bus for communicating with various sensors supported by IHS 100.

As illustrated, IHS 100 may utilize embedded controller (EC) 120, which may be a motherboard component of IHS 100 and may include one or more logic units. In certain embodiments, EC 120 may operate from a separate power plane from the main/host processor(s) 101 and thus the OS operations of IHS 100. Firmware instructions utilized by EC 120 may be used to operate a secure execution system that may include operations for providing various core functions of IHS 100, such as power management, management of operating modes in which IHS 100 may be physically configured and support for certain integrated I/O functions. In some embodiments, EC 120 and sensor hub 114 may communicate via an out-of-band signaling pathway or bus 124.

In various embodiments, chipset 103 may provide processor 101 with access to hardware accelerator(s) 125. Examples of hardware accelerator(s) 125 may include, but are not limited to, INTEL's Gaussian Neural Accelerator (GNA), Audio and Contextual Engine (ACE), Vision Processing Unit (VPU), etc. In some cases, hardware accelerator(s) 125 may be used to perform ML and/or AI operations offloaded by processor 101. For instance, hardware accelerator(s) 125 may load several audio signatures and/or settings, and it may identify an audio source by comparing an audio input to one or more audio signatures until it finds a match.

In some cases, however, hardware accelerator(s) 125 may have significant model concurrency and/or processing latency constraints relative to processor(s) 101. Accordingly, in some cases, context information may be used to select a subset and/or size of data signatures (e.g., audio), also number and/or complexity of models, number of concurrent models (e.g., only two or three models can be processed at a time), and/or latency characteristics (e.g., with 4 signatures or more, detection latency becomes unacceptable) of hardware accelerator(s) 125.

In various embodiments, IHS 100 may not include each of the components shown in FIG. 1. Moreover, IHS 100 may include various other components in addition to those that are shown in FIG. 1. Some components that are represented as separate components in FIG. 1 may be integrated with other components. For example, in some implementations, all or a portion of the features provided by the illustrated components may instead be provided by an SoC.

In a conventional IHS, each application would have to know how to communicate with each specific hardware endpoint 101-124 it needs, which can place a heavy burden on software developers. Moreover, in many situations, multiple applications may request the same information from the same hardware endpoint, thus resulting in inefficiencies due to parallel and/or overlapping code and execution paths used by these applications to perform get and set methods with that same endpoint.

To address these, and other concerns, a platform framework as described herein may enable an overall, comprehensive system management orchestration of IHS 100. Particularly, such a platform framework may provide, among other features, the scalability of multiple applications requesting direct hardware endpoint (e.g., 101-124) access. Additionally, or alternatively, a platform framework as described herein may provide performance optimizations and increased operational stability to various IHS environments.

Figure 2:
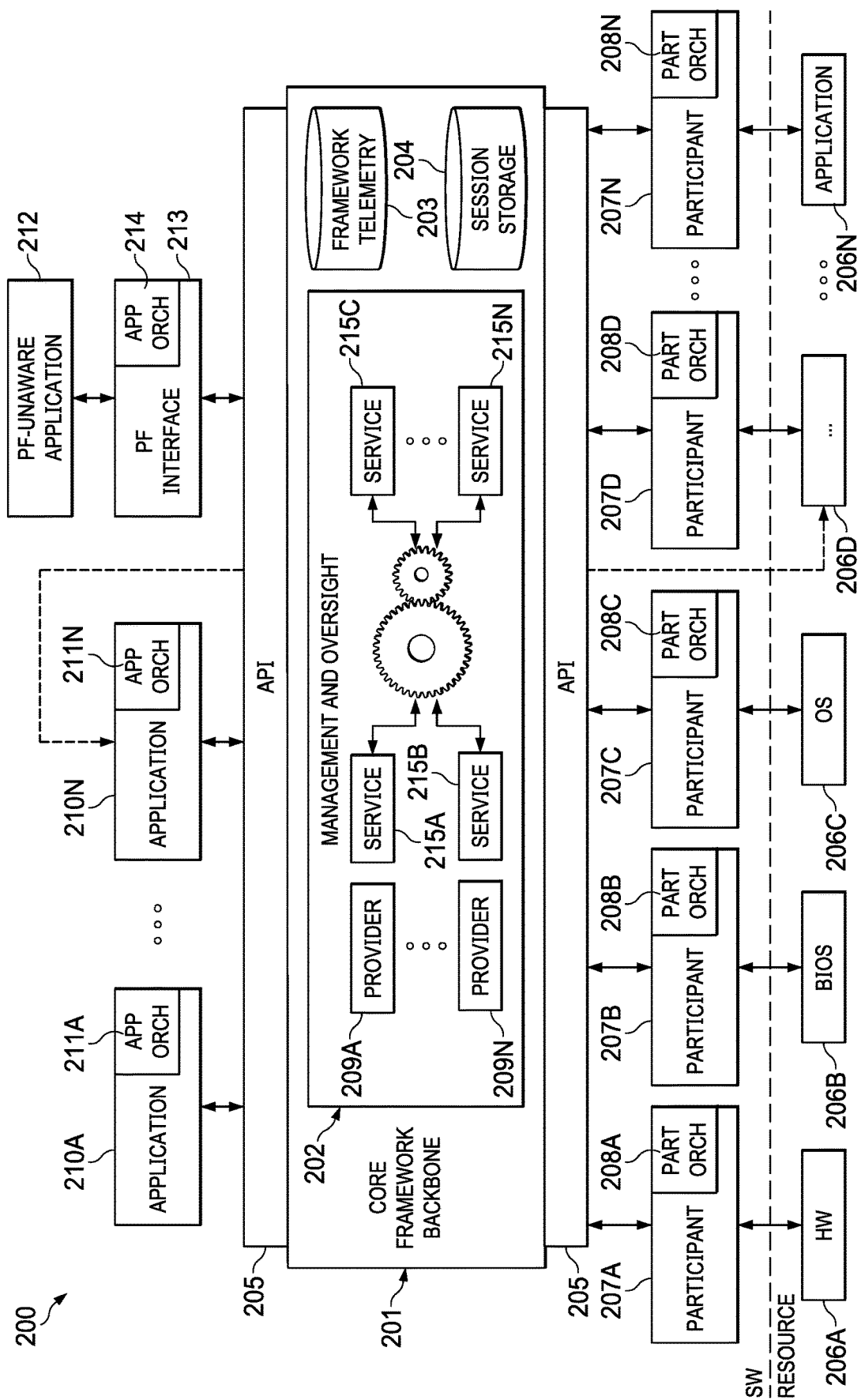
FIG. 2 is a block diagram illustrating an example of a platform framework deployed in an IHS, according to some embodiments.

FIG. 2 is a block diagram illustrating an example of platform framework 200. In some embodiments, IHS 100 may instantiate each element of platform framework 200 through the execution of program instructions, stored in a memory (e.g., system memory 105, storage device(s) 119, etc.), by one or more processors or controllers (e.g., processor(s) 101, GPU 107, hardware accelerators, etc.).

In some implementations, platform framework 200 may be supported by and/or executed within an OS used by IHS 100, and it may be scaled across user and kernel spaces. Additionally, or alternatively, platform framework 200 may be provided as a software library or an ".exe" file.

As shown, platform framework 200 includes core framework backbone 201 and Application Programming Interface (API) 205. Core framework backbone 201 includes management and oversight engine 202 (with services 215A-N), framework telemetry database 203, and session storage database 204.

In operation, platform framework 200 enables the management and orchestration of its participants' communications. The term "participant," as used herein, refers to any entity (e.g., hardware device driver, software module, etc.) configured to register with platform framework 200 by issuing a registration command to management and oversight engine 202 via API 205. Upon registration, each participant may receive a handle usable by services 215A-N within management and oversight engine 202 (and other participants) to address it. In some cases, the handle may be validated by Root-of-Trust (RoT) hardware (e.g., EC 120) as part of the participant registration process.

In various embodiments, platform framework 200 may include at least three different types of participants: producers, consumers, and providers.

Producers are entities (e.g., 207A-N) configured to advertise or publish the capabilities (e.g., variables, primitives, etc.) and statuses of associated hardware (e.g., 206A) or software components (e.g., 206N) to platform framework 200 via API 205, which can then be consumed and/or modified by other participants (e.g., 210A-N). Producers (e.g., 207A-N) may also execute operations with respect to associated hardware components (e.g., 206A-N) based upon instructions (e.g., "set" commands) received from other participants (e.g., 210A-N) via API 205.

On the producer side, resources 206A-N may include, for example, hardware 206A, BIOS 206B, OS 206C, application 206D (a producer role for consumer application 210N), and application 206N (a producer-only application). Each of resources 206A-N may have a producer driver or module 207A-N (a "producer") associated therewith, and each such producer 207A-N may have corresponding orchestrator logic 208A-N that enables its registration and subsequent communications with platform framework 200 via API 205. Once registered, producers 207A-N may provide information to platform framework 200 on their own, upon request by management and oversight engine 202, and/or upon request by any consumer (e.g., 210A-N).

Consumers are entities (e.g., 210A-N) that retrieve data (e.g., a single data item, a collection of data items, data subscribed to from selected producers, etc.) from platform framework 200 using API 205 to then perform one or more actions.

On the consumer side, each of consuming applications 210A-N (a "consumer") may have a corresponding orchestrator logic 211A-N that also enables registration and subsequent communications with platform framework 200 using API 205. For example, applications 210A-N may use API 205 commands request data via platform framework 200 from any registered producer 207A-N or provider 209A-N. In the case of application 212 that is not natively aware of, or compliant with, platform framework 200 (e.g., the application uses direct-to-driver access), interface application or plugin 213 and orchestrator logic 214 may enable its inter-operation with platform framework 200 via API 205.

In various embodiments, orchestrator logic 208A-N, 211A-N, and 214 are each a set of APIs to manage a respective entity, such as applications 211A-N, participants 207A-N, and PF interface 213. Particularly, each entity may use its orchestrator interface to register themselves against platform framework 200, with a list of methods exposed within the orchestrator logic's APIs to query for capabilities, events to listen/respond on, and other orchestration operations tied to routing and efficiency.

In some cases, a single application may operate both as a consumer and a producer with respect to platform framework 200. For example, application 210N may operate as a consumer to receive BIOS data from BIOS 206B via API 205. In response to receiving data from producer 207B associated with BIOS 206B, application 210N may execute one of more rules to change the IHS 100's thermal settings. As such, the same application 210N may also operate as producer 206D, for example, by registering and/or advertising its thermal settings to platform framework 200 for consumption by other participants (e.g., 210A) via API 205.

Providers 209A-N are runtime objects that collect data from multiple participants and make intelligent modifications to that data for delivery to other participants (e.g., consumers) through platform framework 200. Despite a provider (e.g., 209A) being an entity within management and oversight engine 202, it may be registered and/or advertised with platform framework 200 as if it were one of producers 207A-N.

As an example, a status provider (e.g., 209A) may collect hardware information from hardware resource(s) 206A and BIOS information (e.g., from BIOS 206B), make a status determination for IHS 100 based upon that data, and deliver the status to platform framework 200 as if it were a hardware component or driver. As another example, a status provider (e.g., 209A) may receive user presence information from sensor hub 114 (e.g., hardware 206A), receive human interface device (HID) readings from OS 209C, make its user own presence determination based upon some concatenation of those two inputs, and publish its user presence determination to platform framework 200 such that other participants do not have to make redundant findings.

API 205 may include a set of commands commonly required of every participant (consumers and producers) of platform framework 200, for example, to perform get or set operations or methods. Predominantly, producers 207A-N may use API 205 to register, advertise, and provide data to consumers (e.g., 210A-N), whereas consumers 210A-N may use API 205 to receive that data and to send commands to producers 207A-N.

Moreover, applications 210A-N may discover all other participants (e.g., hardware 206A and enumerated/supported capabilities, etc.) that are registered into platform framework 200 using API 205. For example, if hardware 206A includes graphics subsystem 107, application 210A may use API 205 to obtain the firmware version, frame rate, operating temperature, integrated or external display, etc. that hardware 206A provides to platform framework 200, also via API 205.

Applications 210A-N may use information provided by platform framework 200 entirely outside of it, and/or they may make one or more determinations and configure another participant of platform framework 200. For example, application 210A may retrieve temperature information provided by hardware 206A (e.g., GPU 107), it may determine that an operating temperature is too high (i.e., above a selected threshold), and, in response, it may send a notification to BIOS 206B via producer 207B to configure the IHS's thermal settings according to a thermal policy. It should be noted that, in this example, by using API 205, application 210A does not need to have any information or knowledge about how to communicate directly with specific hardware 206A and/or BIOS component 206B.

In various implementations, API 205 may be extendable. Once a participant subscribes to, or registers with, platform framework 200 via API 205, in addition to standard commands provided by API 205 itself (e.g., get, set, discovery, notify, multicast, etc.), the registered participant may also advertise the availability of additional commands or services.

For instance, express sign-in and/or session management application 210A, thermal policy management application 210B, and privacy application 210C may each need to obtain information from one or more user presence/proximity sensors (e.g., sensors 112) participating in platform framework 200 as hardware providers 206A. In this case, the extensibility of API 205 may allow for the abstraction and arbitration of two or more sensors 112 at the platform framework 200 layer; instead of having every application 210A-C reach directly into sensors 112 and potentially crash those devices and/or driver stacks (e.g., due to contention).

As another example, raw thermal and/or power information may be provided into platform framework 200 by one or more sensors 112 as hardware producers 207A and consumed by two or more applications, such as thermal management application 210A and battery management application 210B, each of which may subscribe to that information, make one or more calculations or determinations, and send responsive commands to BIOS 206C using API 205 in the absence of any specific tools for communicate directly with hardware 206A or BIOS 206B.

As yet another example, provider 209A may communicate with an application 211A, such as a battery management application or OS service, and it may set application or OS service 211A to a particular configuration (e.g., a battery performance "slider bar") using API 205 without specific knowledge of how to communicate directly with that application or OS service, and/or without knowing what the application or OS service is; thus platform framework 200 effectively renders provider 209A application and/or OS agnostic.

Within core framework backbone 201, management and oversight engine 202 includes services 215A-N within platform framework 200 that may be leveraged for the operation of all participants. Examples of services 215A-N include, but are not limited to: registration (e.g., configured to enable a participant to register and/or advertise data with platform framework 200), notification (e.g., configured to notify any registered participant of a status change or incoming data), communication/translation between user and kernel modes (e.g., configured to allow code executing in kernel mode to traverse into user mode and vice-versa), storage (e.g., configured to enable any registered participant to store data in session storage database 204), data aggregation (e.g., configured to enable combinations of various status changes or data from the same or multiple participants), telemetry (e.g., configured to enable collection and storage of data usable for monitoring and debugging), arbitration (e.g., configured to enable selection of one among two or more data sources or requests based upon an arbitration policy), manageability (e.g., configured to manage services 215A-N and/or databases 203/204 of platform framework 200), API engine (e.g., configured to extend or restrict available commands), etc.

Framework telemetry database 203 may include, for example, an identification of participants that are registered, data produced by those participants, communication metrics, error metrics, etc. that may be used for tracking and debugging platform framework 200. Session storage database 204 may include local storage for sessions established and conducted between different participants (e.g., data storage, queues, memory allocation parameters, etc.).

In some implementations, a containerized workspace and/or an application executed therewithin may participate as a producer (e.g., 207A-N/206A-N) or as a consumer (e.g., 210A-N) of platform framework 200. Particularly, IHS 100 may be employed to instantiate, manage, and/or terminate a secure workspace that may provide the user of IHS 100 with access to protected data in an isolated software environment in which the protected data is segregated from: the OS of IHS 100, other applications executed by IHS 100, other workspaces operating on IHS 100 and, to a certain extent, the hardware of IHS 100. In some embodiments, the construction of a workspace for a particular purpose and for use in a particular context may be orchestrated remotely from the IHS 100 by a workspace orchestration service. In some embodiments, portions of the workspace orchestration may be performed locally on IHS 100.

In some embodiments, EC 120 or a remote access controller (RAC) coupled to processor(s) 101 may perform various operations in support of the delivery and deployment of workspaces to IHS 100. In certain embodiments, EC 120 may interoperate with a remote orchestration service via the described out-of-band communications pathways that are isolated from the OS that runs on IHS 100. In some embodiments, a network adapter that is distinct from the network controller utilized by the OS of IHS 100 may support out-of-band communications between EC 120 and a remote orchestration service. Via this out-of-band signaling pathway, EC 120 may receive authorization information that may be used for secure delivery and deployment of a workspace to IHS 100 and to support secure communication channels between deployed workspaces and various capabilities supported by IHS 100, while still maintaining isolation of the workspaces from the hardware and OS of IHS 100.

In some embodiments, authorization and cryptographic information received by EC 120 from a workspace orchestration service may be stored to a secured memory. In some embodiments, EC 120 may access such secured memory via an $I^2C$ sideband signaling pathway. EC 120 may support execution of a trusted operating environment that supports secure operations that are used to deploy a workspace on IHS 100. In certain embodiments, EC 120 may calculate signatures that uniquely identify various hardware and software components of IHS 100. For instance, remote EC 120 may calculate hash values based on instructions and other information used to configure and operate hardware and/or software components of IHS 100.

For instance, EC 120 may calculate a hash value based on firmware and on other instructions or settings of a component of a hardware component. In some embodiments, hash values may be calculated in this manner as part of a trusted manufacturing process of IHS 100 and may be stored in the secure storage as reference signatures used to validate the integrity of these components later. In certain embodiments, a remote orchestration service supporting the deployment of workspaces to IHS 100 may verify the integrity of EC 120 in a similar manner, by calculating a signature of EC 120 and comparing it to a reference signature calculated during a trusted process for manufacture of IHS 100.

EC 120 may execute a local management agent configured to receive a workspace definition from the workspace orchestration service and instantiate a corresponding workspace. In this disclosure, "workspace definition" generally refers to a collection of attributes that describe aspects a workspace that is assembled, initialized, deployed and operated in a manner that satisfies a security target (e.g., the definition presents an attack surface that presents an acceptable level of risk) and a productivity target (e.g., the definition provides a requisite level of access to data and applications with an upper limit on latency of the workspace) in light of a security context (e.g., location, patch level, threat information, network connectivity, etc.) and a productivity context (e.g., performance characteristics of the IHS 100, network speed, workspace responsiveness and latency) in which the workspace is to be deployed. A workspace definition may enable fluidity of migration of an instantiated workspace, since the definition supports the ability for a workspace to be assembled on any IHS 100 configured for operation with the workspace orchestration service.

In specifying capabilities and constraints of a workspace, a workspace definition (e.g., in the form of an XML file, etc.) may prescribe one or more of: authentication requirements for a user, types of containment and/or isolation of the workspace (e.g., local application, sandbox, docker container, progressive web application (PWA), Virtual Desktop Infrastructure (VDI)), applications that can be executed in the defined containment of the workspace with access to one or more data sources, security components that reduce the scope of the security target presented by the productivity environment (e.g., DELL DATA GUARDIAN from DELL TECHNOLOGIES INC., anti-virus software), the data sources to be accessed and requirements for routing that data to and from the workspace containment (e.g., use of VPN, minimum encryption strength), workspace capabilities available to independently attach other resources, whether or not the workspace supports operability across distinct, distributed instances of platform framework 200 (e.g., by including or excluding an identity of another platform framework, or an identity of another workspace with access to a platform framework).

In some implementations, workspace definitions may be based at least in part on static policies or rules defined, for example, by an enterprise's Information Technology (IT) personnel. In some implementations, static rules may be combined and improved upon by machine learning (ML) and/or artificial intelligence (AI) algorithms that evaluate historical productivity and security data collected as workspaces are life cycled. In this manner, rules may be dynamically modified over time to generate improved workspace definitions. If it is determined, for instance, that a user dynamically adds a text editor every time he uses MICROSOFT VISUAL STUDIO from MICROSOFT CORPORATION, then the workspace orchestration service may autonomously add that application to the default workspace definition for that user.

During operation, as an instantiated workspace is manipulated by a user, new productivity and security context information related to the behavior or use of data may be collected by the local management agent, thus resulting in a change to the productivity or security context of the workspace. To the extent the user's behavioral analytics, device telemetry, and/or the environment has changed by a selected degree, these changes in context may serve as additional input for a reevaluation, and the result may trigger the remote orchestration service to produce a new workspace definition (e.g., adding or removing access to the workspace as a consumer or producer to an external or distributed platform framework), extinguish the current workspace, and/or migrate contents of the current workspace to a new workspace instantiated based on the new workspace definition.

In some cases, platform framework 200 may be extensible or distributed. For example, different instances or portions of platform framework 200 may be executed by different processing components (e.g., processor(s) 101 and EC 120) of IHS 100, or across different IHSs. Additionally, or alternatively, independent instances of platform framework 200 may be executed by different workspaces and in secure communications with each other, such that a participant, service, or runtime object's handle may identify the particular platform framework 200 that the participant or service is registered with. Services between these different instances of platform frameworks may communicate with each other via an Interprocess Communication (IPC) resource specified in a handle provided by the workspace orchestration service for communications with the workspace(s) involved.

In some embodiments, a workspace definition may specify the platform framework namespaces that a workspace will rely upon. Producers and providers may be associated with namespaces that are supported by a platform framework. For example, producers associated with each of the cameras that are available may be registered within a camera namespace that is supported by platform framework 200. In the same manner, producers and providers that provide user presence detection capabilities may be registered within a user presence detection namespace that is supported by platform framework 200. Other examples of namespaces may include, but are not limited to: a location namespace, a posture namespace, a network namespace, an SoC namespace, etc.

For instance, a workspace definition may specify registration of a workspace in a user presence detection namespace of the IHS, where user presence information may be utilized by the workspace in enforcing security protocols also set forth in the workspace definition, such as obfuscating the graphical interfaces of the workspace upon detecting a lack of a particular user in proximity to the IHS, thus preserving the confidentiality of sensitive data provided via the workspace.

In some cases, the workspace definition of a workspace may specify that the workspace: instantiate its own a platform framework, use a platform framework instantiated within another workspace (in the same or different IHS), and/or use a combination of different instances of platform frameworks (one or more of which may be instantiated by another workspace). Moreover, the platform framework option as prescribed by a workspace definition may be based upon the resolution of any of the aforementioned contextual rules (e.g., based on IHS posture, location, user presence, etc.).

As used herein, the term "runtime object" refers to a piece of code (e.g., a set of program instructions) or information that can be instantiated and/or executed in runtime without the need for explicit compilation. For example, in the context of an arbitration operation, the code that executes the arbitration may already be compiled, whereas the polic(ies) that the code enforces may change at runtime (e.g., by a user's command in real time) and therefore may be considered "runtime objects."

Conventionally, when an application needed to get telemetry data, that application would have to know how to access each component of IHS 100 to retrieve its data. Using systems and methods described herein, however, one or more applications (e.g., 210A-N) may get telemetry data via a telemetry service (e.g., 215A) of platform framework 200 configured to perform centralized telemetry collection and managed method of collection and distribution across registered participants.

In various embodiments, any or all providers/producers 209A-N and 207A-N may register and deliver telemetry data to telemetry service 215A via API 205. During registration, these providers/producers may identify a push (providers sends data to the framework which the telemetry service collects) or a pull (telemetry agent must request data at that time) requirement for the telemetry data with additional requirements of a solution set (e.g., polling or sampling frequency, data size, etc.). Registration may also allow for providers/producers to prescribe authentication requirements for telemetry collection (e.g., mandate authorization with OS service, telemetry knowledge, etc.).

Consumers/applications 210A-N may make calls to telemetry service 215A to receive and/or collect telemetry data of: (a) a selected depth (e.g., all registrations, class of providers—sensors, thermal data, specific device/types—TOF presence/distance, etc.), and/or (b) within a selected period of time (e.g., most recent, all active, within last 5 minutes, etc.).

In some cases, applications 210A-N may send telemetry events onto platform framework 200 for continued processing. Telemetry logic within telemetry service 215A may arbitrate the priority of the collection routines to optimize the runtime impact on the overall system as well as to provide service notifications to any applications that request alerting of change in provider input.

Each of provider(s) 209A-N and/or producer(s) 207A-N may register its telemetry collection routine capabilities to telemetry service 215A. During registration, provider options may include, for example, interrupt (with configurable trip points and/or hardware-defined trip points) and polling (with configurable polling or sampling frequency, min/max time between polling operations, etc.).

Moreover, applications 210A-N may request different information from telemetry service 215A (e.g., notification when requested thresholds have been achieved from providers—battery level <30%, etc.), or on-demand delivery of current telemetry information (e.g., instant data—requests a new read of all data from all providers, most recent read—returns the last reported telemetry values from the provider, last update in recent X time—requests most recent telemetry information from providers that has been collected in the last X timeframe; if no collection has occurred, telemetry service may request the active state).

Telemetry service 215A may manage and arbitrate all telemetry requests from applications and providers with the goal of minimizing requests for telemetry from the hardware/provider sets. Telemetry service 215A may perform evaluation of each telemetry data type and based on historical rate of changes, and it may identify telemetry items for which it may be able to make inferences for optimal productivity. This may include, for example, providing extrapolated data (based on linear/exponential/etc. changes of data) to a requesting application 210A-N.

In various embodiments, systems and methods described herein may provide operations for arbitrating telemetry data requests, for example, based upon the application of an arbitration policy. In some cases, the order in which telemetry data requests is fulfilled may be from highest to lowest priority. In other cases, the order in which telemetry data requests is fulfilled may be based upon the status of other runtime objects representing context information, such as, for example, operating temperature (from different temperature sensors or different IHS hardware components), battery metrics (e.g., from an OS and a battery management unit), IHS performance (e.g., from an OS and an optimization application), IHS posture (e.g., from different posture sensors), audio capture (e.g., an external and an internal microphone), video capture (e.g., from different cameras), IHS location (e.g., from a wireless network interface and a GPS sensor), etc.

In some cases, telemetry service 215A may perform a first arbitration operation upon a set of runtime objects for all or most participants (e.g., 210A-N) based upon a first arbitration policy, and one or more differentiated arbitration objects may register with platform framework 200 to implement a second or custom arbitration operation, different from the first operation, and made available to other subscribed applications, also via telemetry service 215A. In some cases, the arbitration policy and or contextual conditions associated with the policy may be specified, for example, in a workspace definition file or the like.

Figure 3:
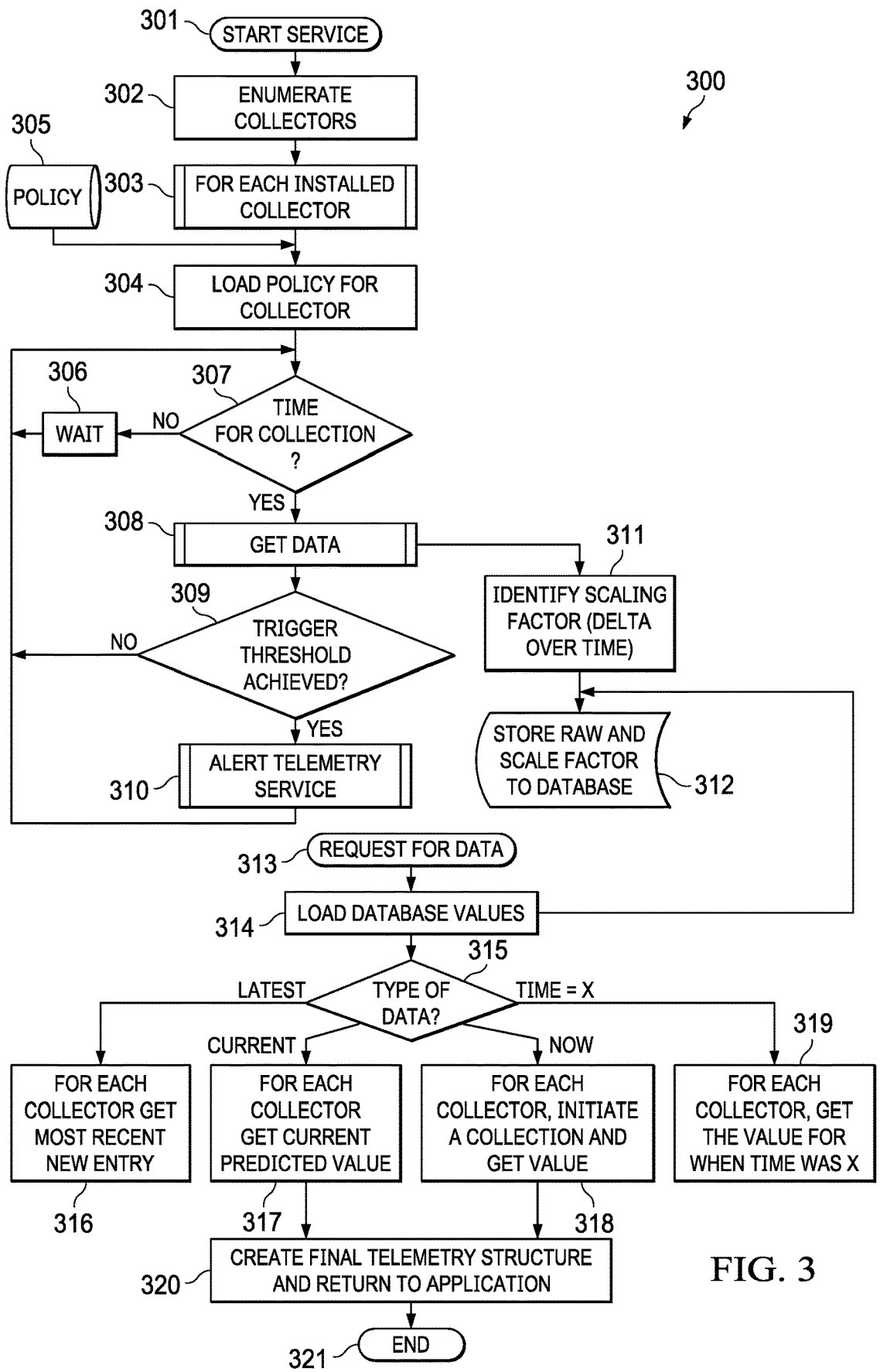
FIG. 3 is a flowchart illustrating an example of a method for platform framework telemetry, according to some embodiments.
Figure 4A:
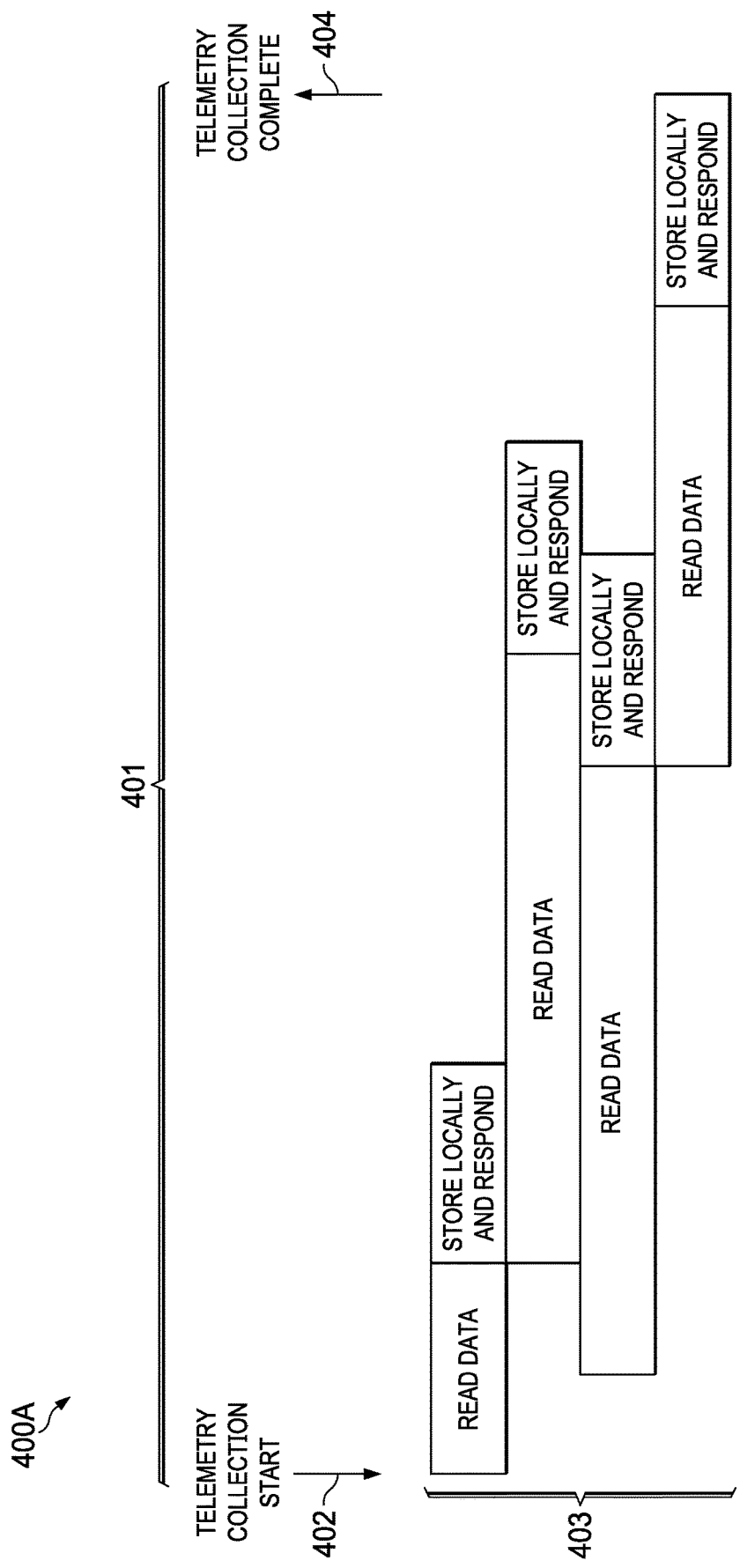
Figures 1, 4B:
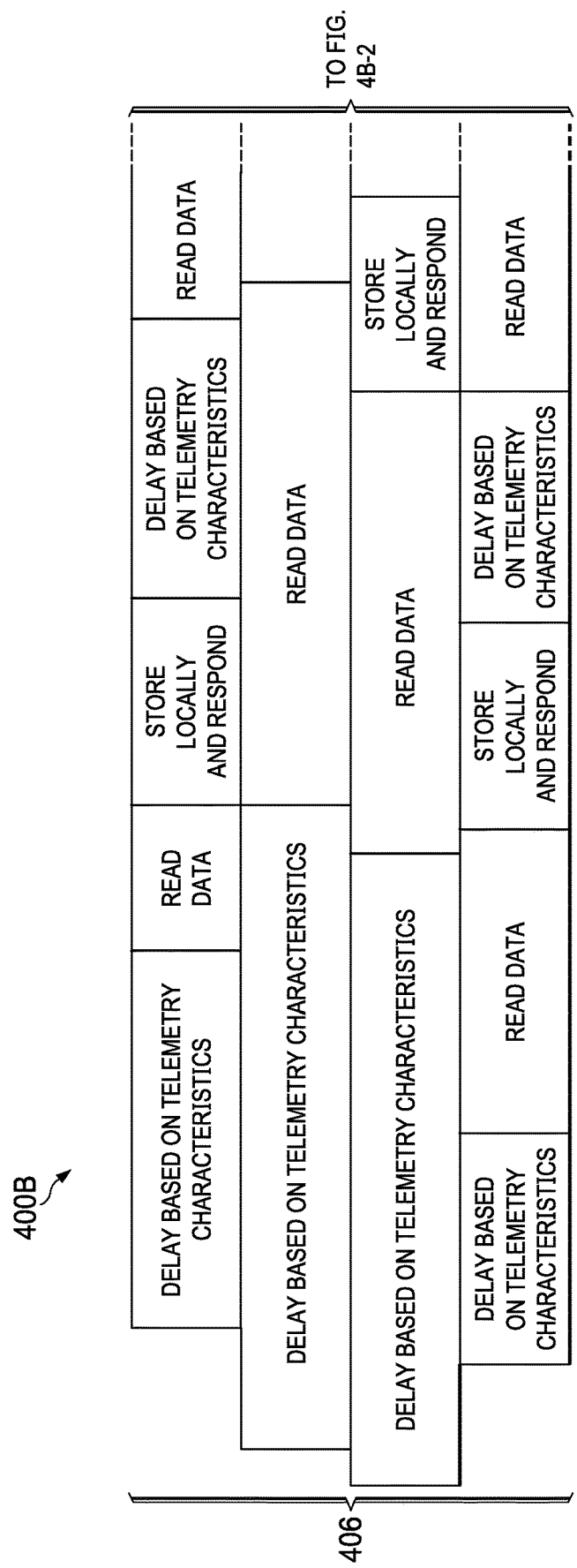
Figures 2, 4B:
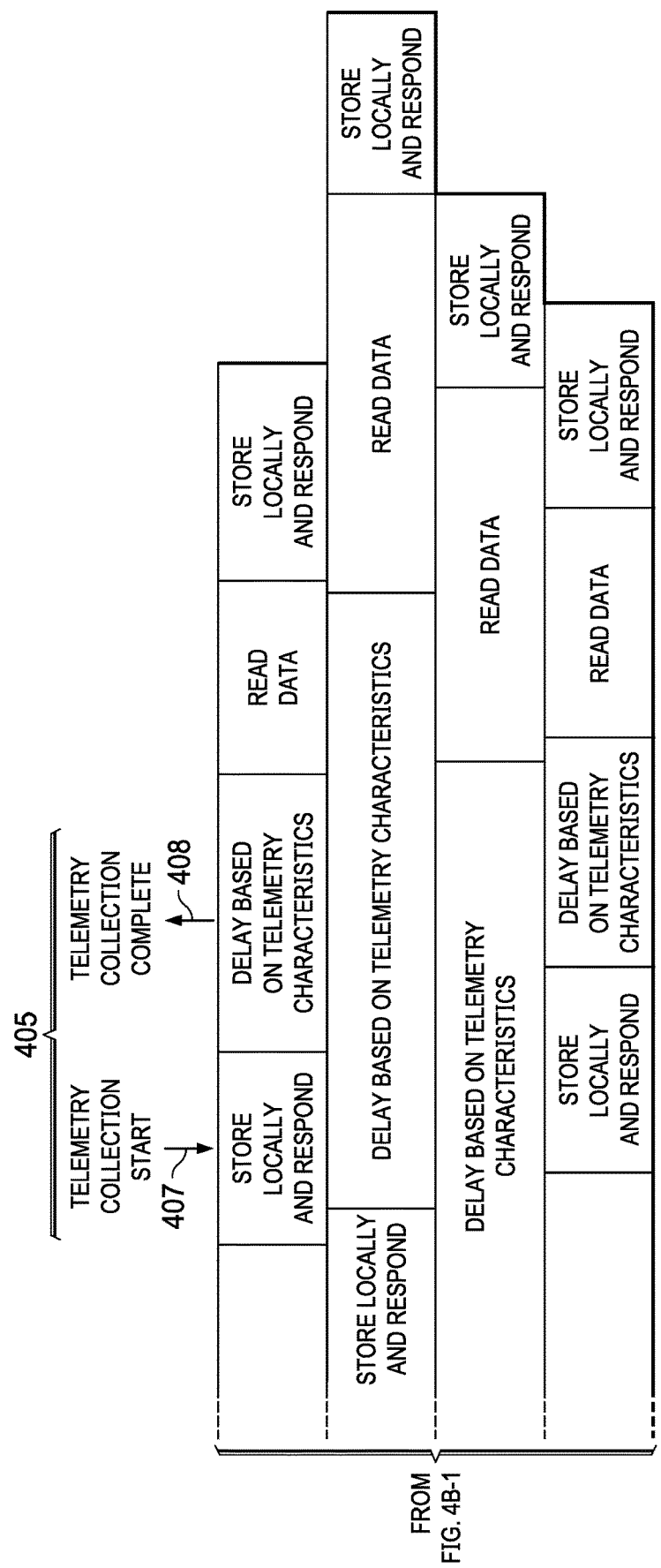

FIG. 3 is a flowchart illustrating an example of method 300 for platform framework telemetry, according to some embodiments. As shown, collection portion of method 300 begins at block 301 with the instantiation of telemetry service (e.g., 215A). At 302, method 300 enumerates registered participants as telemetry data collectors. Block 303 selects each installed collector and block 304 loads and/or implements a telemetry collection or arbitration policy 305 for that collector.

At block 307, method 300 determines if it is time to collect telemetry data. If not, control passes to block 306 and method 300 waits in a loop. When it is time for collection, as determined by block 307, block 308 receives or retrieves the telemetry data (e.g., the telemetry service sends a get command to a given collector). At block 309, if the data triggers a threshold value, for example, as outlined in the telemetry or arbitration policy, then the telemetry service may generate an alert at 310; otherwise control returns to block 307.

At block 311, method 300 may identify a scaling factor for the telemetry data (e.g., based upon a delta over time). Then, at block 312, method 300 may store raw telemetry data and the scaling factor to telemetry database 203. In some cases, collection operations 301-312 may be performed periodic on a collector-by-collector basis, and the raw, register information may be stored along with other types of telemetry information such as shown in Table I:

TABLE 1

| Data Type | System Impact (SMI) | Stability | Duration of Data Collection |
|---|---|---|---|
| Battery State | Small | Normal | Short |
| Charger Spikes | High | Static | Medium |
| Fan status | Low | Volatile | Long |
| EC connectivity | High | Normal | Medium |

The reporting portion of method 300 begins at block 313 when telemetry service (e.g., 215A) receives a request for data, for example from an application (e.g., 210A-N) registered with platform framework 200 via API 205. At 314, method 300 loads database values (e.g., from telemetry database 203). At 315, method 300 evaluates the request to identify the type of telemetry data being requested.

If the type of data being requested is the latest data, block 316 retrieves the most recent new database entry that fulfills the request for each collector identified in the request. If the type of data being requested is current data, block 317 retrieves a current predicted value that fulfills the request for each collector identified in the request. If the type of data being requested is on-demand collection data, block 318 initiates a collection process and gets a value that fulfills the request for each collector identified in the request. If the type of data being requested is for a specific time, block 319 retrieves values collected during a selected time interval that fulfill the request for each collector identified in the request. In some cases, reporting operations 316-319 may leverage machine learning, artificial intelligence, and/or historical trends, as well as latest or current collection data points.

At block 320, method 300 creates a telemetry data structure to satisfy the telemetry request of block 313, and it returns the telemetry data structure to the requesting application via API 205. Method 300 ends at block 321.

In some embodiments, API 205 may include a format that describes a telemetry collection response object (e.g., with variables such as device state, collection/advertisement rate, power consumption, duration, etc.) as follows:

```
{
    "comments": "Telemetry Collection Response",
    "auth_token": "rt12342d",
    "container_id": "abcd",
    "platform_id": "p5435",
    "conditions": [{
        "comments": "Telemetry Collection report',
        "provider": "UPD",
        "provider_ver": "3.2.2.",
        "provider_ven": "Intel",
        "collection": "time",
        "Data":
            ["type":"Human presence", ["Presence",
        "Confidence",....]
            ["type":"Face", ["Presence", "face nums",
        "Confidence",....
            ["f1": "true", "atten":"yes", "dist":"distance"...]
            ["f2": "true", "atten":"yes", "dist":"distance"...]
            ["f3": "true", "atten":"yes", "dist":"distance"...]
            ]
    },{
        "provider": "EC",
        "provider_ver": "1.",
        "provider_ven": "Dell",
        "collection": "time",
        "Data": ["type": "lidAD": "false", "lidBC", "true"]
    }, {
        ...
    }]
}
```

FIGS. 4A, 4B-1, and 4B-2 are block diagrams illustrating examples of methods 400A and 400B for telemetry data collection and processing, according to some embodiments. In method 400A, telemetry collection starts in operation 402 (e.g., upon instantiation of a telemetry service) and it may trigger time interval 401 of telemetry collection, where for each collector (in each line or row) read data time periods are followed by storage and response time periods—which may be disposed serially with respect to each other—until telemetry collection ends at 404.

In method 400B, however, telemetry collection and reporting may be improved, for example, by promoting a shorter period of telemetry collection 405. For each collector 406, concurrently, telemetry data may be read during a first alternating time interval followed by a second alternating storage and response time interval, which is then followed by a delay or idle period. In this case, telemetry collection period 405 between telemetry collection start 407 and telemetry complete 408 events is shorter than time period 401 of method 400A.

Moreover, the duration of the delay or idle period may be selected based on telemetry characteristics (of the data being collected) and/or context information. For example, the duration of the delay or idle period may be directly or inversely proportional to a telemetry data polling or sampling rate. Additionally, or alternatively, the duration of the delay or idle period may be selected based upon context information such as: a temperature metric, a power state, a battery metric, an IHS posture, user proximity or presence data, an IHS location, etc. In some cases, the duration of the delay or idle period, and/or the contextual rules usable to select that duration, may be prescribed in a workspace definition.

As such, systems and methods described herein may provide the ability to have application sources register securely with telemetry needs with platform framework 200. Additionally, or alternatively, systems and methods described herein may provide the ability for application sources to define various methods of telemetry notification—event driven (software), event/interrupt driven (hardware), frequency driven, etc. Additionally, or alternatively, systems and methods described herein may provide the ability to define various methods of telemetry data properties (e.g., most recent vs instant collect vs other, etc.).

With respect to SoC telemetry in particular, within platform framework 200, systems and methods described herein may: (a) set and get functions for SoC runtime objects when they register with platform framework 200 (e.g., periodic, one-time, or event driven SET/GET); (b) perform arbitration, based on priorities, for master "SET" across SoC runtime objects registered with platform framework 200, as well as arbitration objects; (c) have minimal SoC overhead GETs for multiple objects registered in platform framework 200 accessing the same SoC subsystem register value, at different types of access nature (e.g., once a second vs once in 10 seconds); (d) chain receiving runtime objects that an application wants to trigger upon receive of a GET telemetry event (e.g., object 1 might register for GET for register X once a second, and also trigger a compute of another object 2 upon the GET trigger, etc.); and so on.

In some embodiments, an SoC telemetry service (e.g., 215B) within platform framework 200 may leverage secure pipes with access to SoC register values. The SoC telemetry service may be configured to: process SET/GET requests via API 205, to provide SET/GET responses to calling object(s) via API 205, and to perform arbitration (e.g., as described in items (a)-(d) of the paragraph above).

Figure 5:
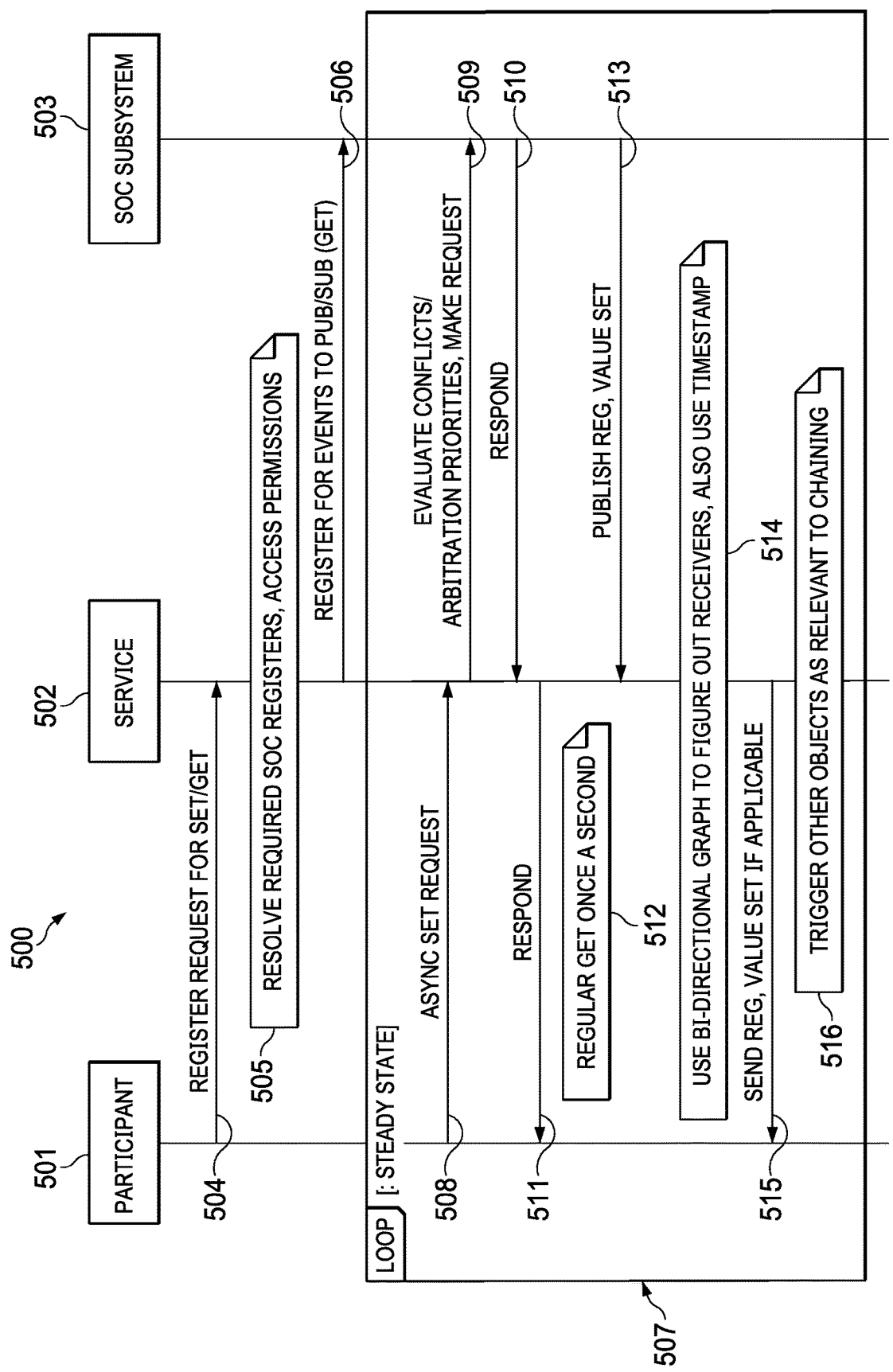
FIG. 5 is a message diagram illustrating an example of a method for System-on-Chip (SoC) telemetry, according to some embodiments.

FIG. 5 is a message diagram illustrating an example of method 500 for SoC telemetry, according to some embodiments. In operation 504, participant 501 (e.g., 210A) registers with telemetry service 502 (e.g., 215A) to receive get/set telemetry data from SoC subsystem 503 (e.g., 207A). In operation 505, telemetry service 502 may resolve required SoC registers and access permissions to satisfy the request. Then, in operation 506, telemetry service 502 may register with SoC subsystem 503 for events published thereby or subscribed thereto.

Loop 507 represents the steady-state portion of method 500. Particularly, in operation 508 participant 501 sends telemetry service 502 an asynchronous set request or command. In operation 509, telemetry service 502 evaluates conflicts and/or arbitration priorities and makes the request to SoC subsystem 503. SoC subsystem 503 responds in operation 510, and telemetry service 502 forwards the response (or modifies it before sending it) to participant 501 in operation 511, as an example 512, once a second.

In operation 513, SoC subsystem 503 publishes a register value set to telemetry service 502. In operation 514, telemetry service 502 uses bi-directional graph data to identify receiving participants of the value set using priorities and/or timestamps. In operation 515, telemetry service 502 sends the register value set to participant 501, if applicable, and at 516 method 500 triggers other objects relevant to chaining.

Figure 6:
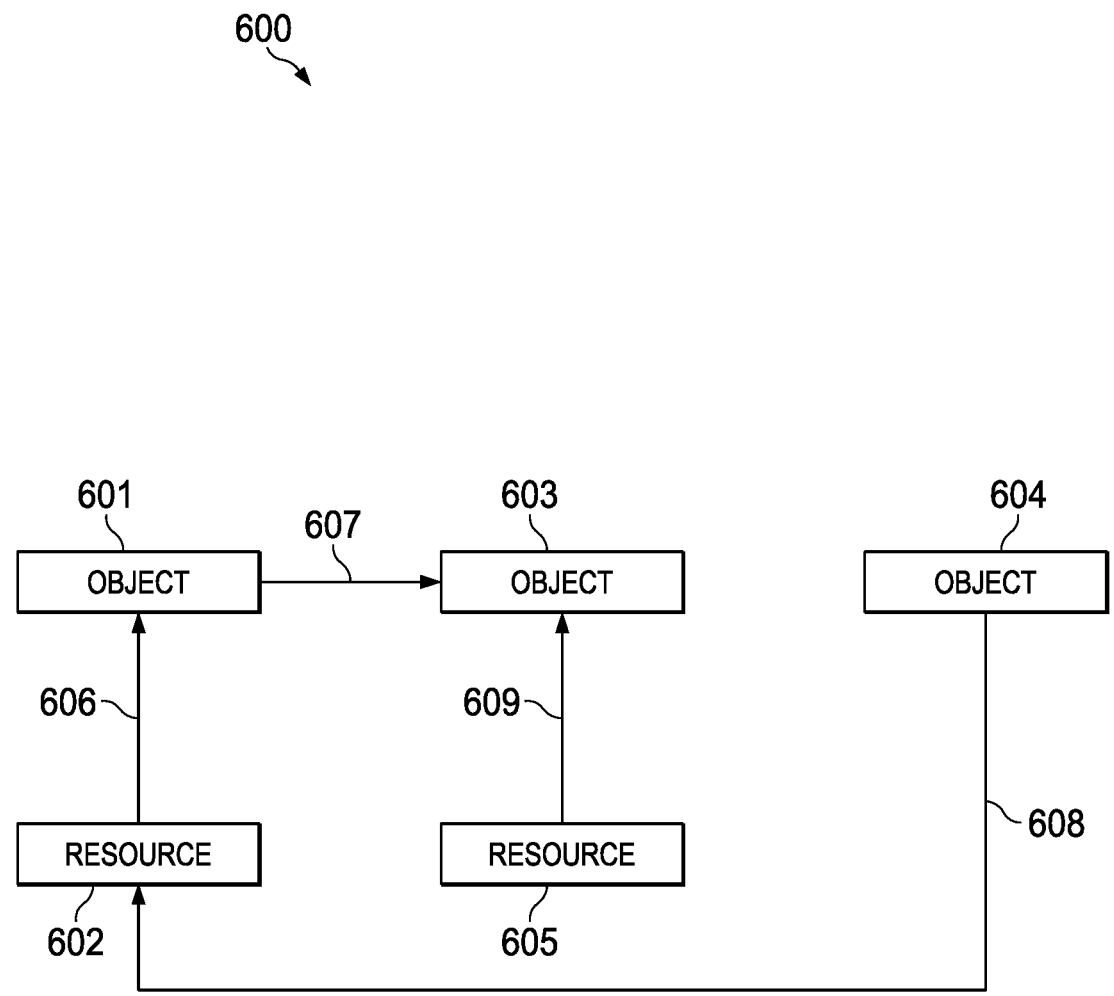
FIG. 6 is a diagram illustrating an example of a bi-directed graph, according to some embodiments.

In some cases, telemetry service 502 may maintain a bi-directed graph data structure with index entry being the SoC subsystem register address. An example is shown in FIG. 6, for the bi-directed graph 600 and data structure of each node, along with blocking resolution of arbitration priorities for linked telemetry set/get and compute.

In bi-directed graph 600, objects 601, 603, and 604 may be telemetry data requesting objects within platform framework 200 whereas resources 602 and 605 may be any telemetry data generating/collecting entity such as, for example, SoC registers. Assume a use case where: (i) object 601 gets the value of resource 602 once a second, with a high priority, (ii) at every 10 gets, object 601 chain triggers object 603 compute, with a medium priority, (iii) object 604 sends a set request to resource 602 every 2 minutes, with a medium priority, and (iv) object 603 sends a get request to resource 605 prior to doing its compute, with a high priority.

In this example, telemetry service 502 may resolve priority of operations (i)-(iv) as follows: (i)>(iv)>(ii)>(iii). Moreover, as shown in graph 600, the JSON processing of SET/GET may produce and/or maintain an internal data structure for each of the nodes of the graph, for the linkage and telemetry events to trigger in/out, with linkage tokens for platform framework 200 objects.

For example, a sample data structure of each node of bi-directed graph 600 may be as follows:
Node_id//object or register id
Input chains//see JSON for structure
Output chains//see JSON for structure
Compute_operation//computed when the conditions are met . . . .

In some embodiments, API 205 may include a format that describes a get/set request object registration (e.g., to initialize or de-initialize get/set) for an SoC or subsystem as follows:

```
{
  "comments": "API spec for GET/SET - REQ registration (to initialize or de-initialize GET/SET",
  "auth_token": "rt12342d",
  "platform_id": "p5435",
  "ipf_receiving_object_id": "543321",
  "get_list": [
    { "subsystem_id": "12345",
      "subsystem_register_info": [
        { "req_token": "value",
          "req_type": "set of get",
          "priority": "1 through 10. Only 1 subsystem can get 1 (highest). Critical for SET",
          { "register_addr": ["addr_value_scalar_or_vector"],
          "blocking": "yes or no",
          "comment_on_blocking": "if yes then, must do before chaining I/O steps",
          "periodicity":
"null_for_one_off_or_event_driven_else_periodicity_in_ms",
          "event_trigger_input_ipf_subsystem_json: { "same struct as this for event trigger along with trigger token"},
          "event_trigger_output_ipf_subsystem_json: { "same struct as this for event trigger along with trigger token"},
        }, {
          ...
        }],
      },
      {
        ...
      }]
}
```

In some embodiments, API 205 may include a format that describes a get/set request response object registration for an SoC or subsystem as follows:

```
{
  "comments": "API spec for GET/SET - RES registration (to initialize or de-initialize GET/SET",
  "auth_token": "rt12342d",
  "platform_id": "p5435",
  "ipf_receiving_object_id": "543321",
  "get_list": [
    { "subsystem_id": "12345",
      "subsystem_register_info": [
```

```
      { "req_token": "value",
        "response": "success_or_fail",
        "response_code": "12345",
        "get_value": "value",
        "get_timestamp": "timestamp",
      }, {
        ...
      }],
    },
    {
      ...
    }]
}
```

Accordingly, systems and methods described herein may also provide a software service within platform framework 200 that handles set/get operations tied to SoC telemetry, avoiding redundancies and system loading while handling complex use cases such as chaining compute, etc. Additionally, or alternatively, the software service may queue requests for telemetry from platform framework 200 object based upon system and/or object policy.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and
a memory coupled to the processor, the memory having program instructions stored thereon that, upon execution, cause a telemetry service of the IHS to:
receive telemetry data comprising get and set request operations at the telemetry service from at least one producer registered with a platform framework via an Application Programming Interface (API);
receive a request for at least a subset of the telemetry data from a consumer registered with the platform framework via the API; and
transmit the subset of the telemetry data to the consumer.

2. The IHS of claim 1, wherein the request for the subset of the telemetry data is received from the consumer prior to the telemetry data being received from the at least one producer.

3. The IHS of claim 1, wherein the program instructions, upon execution, further cause the IHS to:
receive another request for at least the subset of the telemetry data from another consumer after having received the request; and
transmit the subset of the telemetry data to the other consumer prior to transmission of the subset of the telemetry data to the consumer.

4. The IHS of claim 3, wherein to transmit the subset of the telemetry data to the other consumer, the program instructions, upon execution, further cause the IHS to resolve an arbitration policy in favor of the other consumer.

5. The IHS of claim 3, wherein to resolve the arbitration policy, the program instructions, upon execution, further cause the IHS to determine that a priority of the other request is higher than a priority to the request.

6. The IHS of claim 5, wherein the determination is based at least in part upon context information comprising at least one of: a temperature metric, a power state, a battery metric, an IHS posture, user proximity or presence data, or an IHS location.

7. The IHS of claim 5, wherein the determination is based at least in part upon bi-directed graph data representing get and set operations.

8. The IHS of claim 7, wherein the bi-directed graph data is indexed by a System-on-Chip (SoC) register address.

9. The IHS of claim 7, wherein each of the get and set operations is associated with a priority value.

10. The IHS of claim 8, wherein the priority value is indicative of a dependency between get and set operations.

11. The IHS of claim 1, wherein the telemetry service is configured to:
receive the telemetry data from a plurality of producers concurrently during a first alternating time interval; and
transmit the subset of the telemetry data to the consumer during a second alternating time interval following the first time interval, wherein a length of the second time interval is configurable based upon a characteristic of the telemetry data.

12. The IHS of claim 11, wherein the characteristic comprises a telemetry data polling or sampling rate.

13. The IHS of claim 11, wherein the length of the second time interval is further configurable based upon context information comprising at least one of: a temperature metric, a power state, a battery metric, an IHS posture, user proximity or presence data, or an IHS location.

14. A memory storage device having program instructions stored thereon that, upon execution by an Information Handling System (IHS), cause the IHS to:
collect telemetry data comprising get and set request operations, by a producer registered with a platform framework via an Application Programming Interface (API); and
transmit the telemetry data comprising the get and set request operations to a telemetry service within the platform framework via the API, wherein the telemetry service is configured to:
receive a request for at least a subset of the telemetry data from a consumer registered with the platform framework via the API; and
transmit the subset of the telemetry data to the consumer.

15. The memory storage device of claim 14, wherein the telemetry service is further configured to:
receive another request for at least the subset of the telemetry data from another consumer after having received the request;
resolve an arbitration policy in favor of the other consumer; and
transmit the subset of the telemetry data to the other consumer prior to transmission of the subset of the telemetry data to the consumer.

16. The memory storage device of claim 15, wherein to resolve an arbitration policy in favor of the other consumer, the telemetry service is further configured to determine that a priority of the other request is higher than a priority to the request based upon bi-directed graph data representing get and set operations.

17. A method, comprising:
   transmitting a request for telemetry data by a consumer registered with a platform framework via an Application Programming Interface (API) to a telemetry service within the platform framework; and
   receiving the telemetry data comprising get and set request operations from the telemetry service, wherein the telemetry service is configured to receive the telemetry from at least one producer registered with the platform framework via the API.

18. The method of claim 17, wherein the telemetry service is further configured to:
   receive another request for at least the subset of the telemetry data from another consumer after having received the request;
   resolve an arbitration policy in favor of the other consumer; and
   transmit the subset of the telemetry data to the other consumer prior to transmitting the subset of the telemetry data to the consumer.

19. The method of claim 18, wherein to resolve an arbitration policy in favor of the other consumer, the telemetry service is further configured to determine that a priority of the other request is higher than a priority to the request based upon bi-directed graph data representing get and set operations.

* * * * *